Jan. 13, 1959
R. B. HELSER
2,868,364
DISPLAY DEVICE
Filed Feb. 1, 1956
2 Sheets-Sheet 1
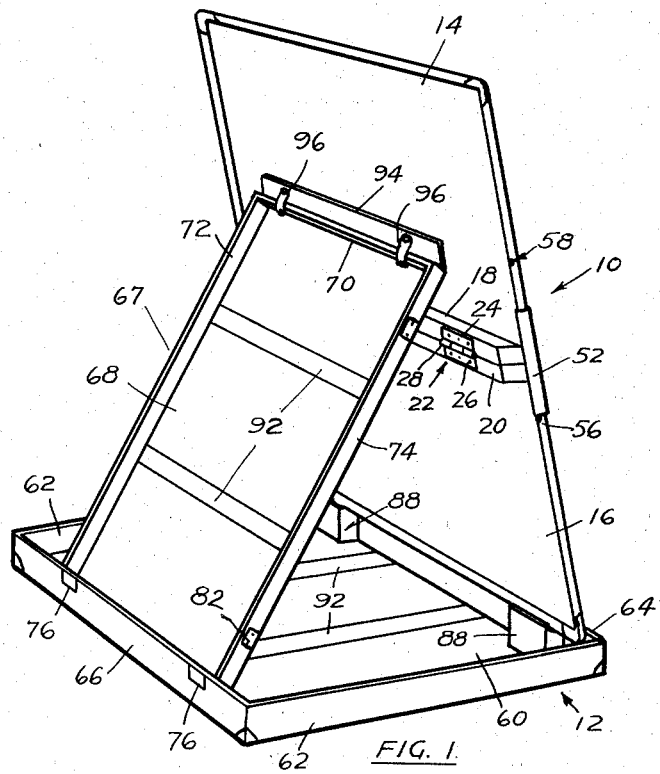
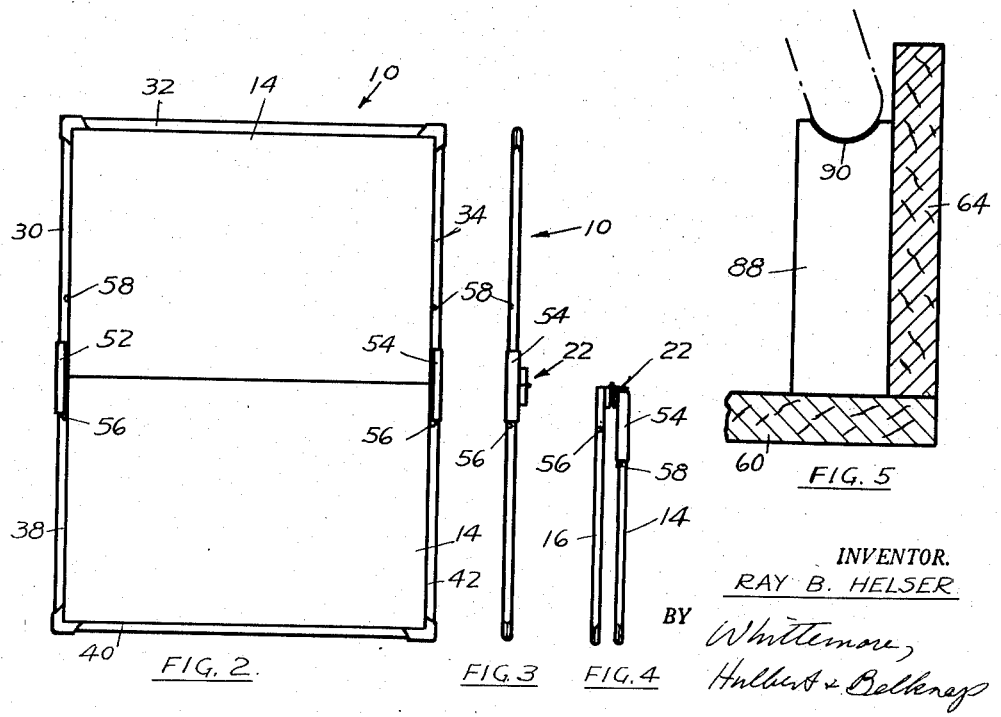
INVENTOR.
RAY B. HELSER
BY Whittemore,
Hulbert & Belknap Jan. 13, 1959
R. B. HELSER
2,868,364
DISPLAY DEVICE
Filed Feb. 1, 1956
2 Sheets-Sheet 2
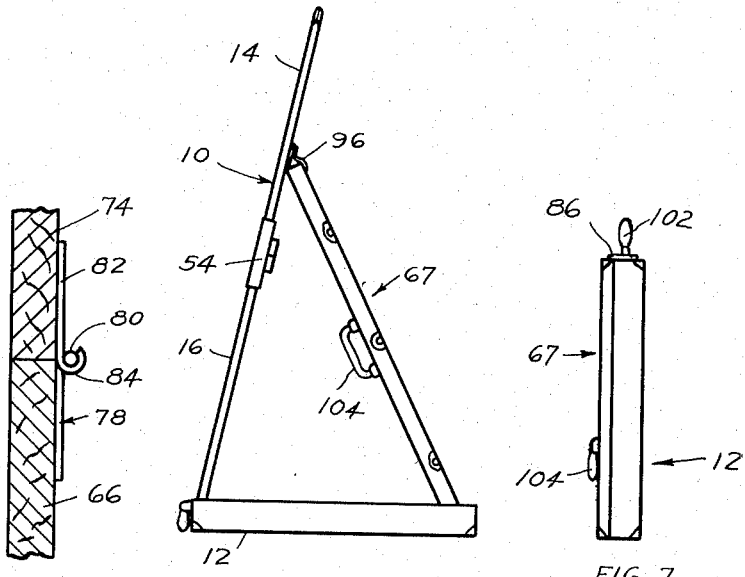
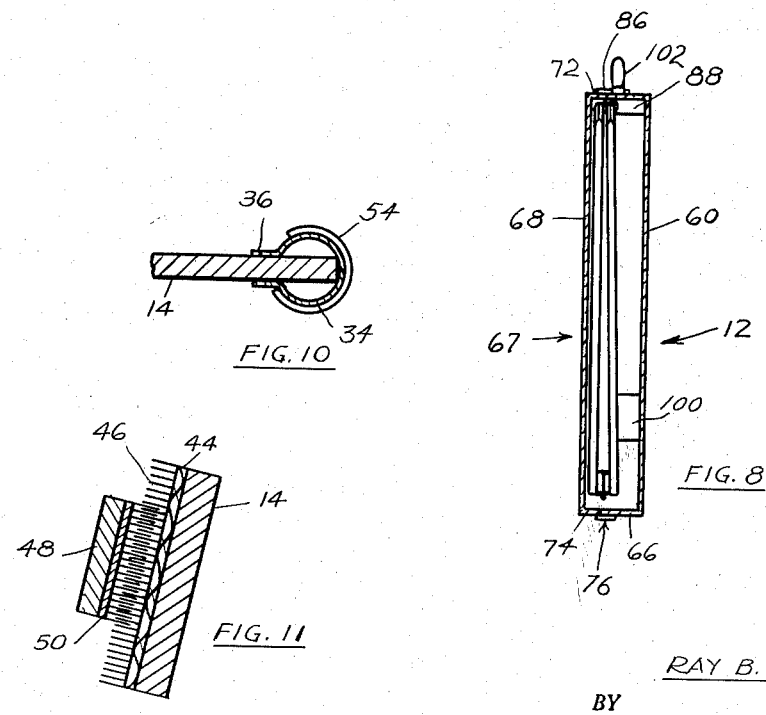
INVENTOR.
RAY B. HELSER
BY

United States Patent Office 2,868,364
Patented Jan. 13, 1959

2,868,364
DISPLAY DEVICE

Ray B. Helser, Bloomfield Hills, Mich., assignor to Florez, Incorporated, Detroit, Mich., a corporation of Michigan Application February 1, 1956, Serial No. 562,783

1 Claim. (Cl. 206—45.2)

This invention relates to a display device.

One object of this invenion is to provide a display device which is particularly useful in conducting visual training programs, yet which has general application as well.

Another object of the invention is to provide a display device which is adapted to be folded into a compact package when not in use.

Still another object of the invention is to provide a display device including a carrying case in which the display device may be stored and moved from place to place when not in use, the carrying case also serving as a prop and support for the display board.

A further object of the invention is to provide a display device which may be readily set up for use and stored away in a minimum amount of time.

Other objects of the invention will become apparent as the following description proceeds, especially when considered in connection with the accompanying drawings, wherein:

Figure 1 is a prospective view of the display device of my invention showing the display board propped up for display purposes.

Figure 2 is a front elevational view of the display board.

Figure 3 is an elevational view of the display board looking towards the edge.

Figure 4 is a view similar to Figure 3 but showing the display board folded.

Figure 5 is an enlarged detail view.

Figure 6 is a side elevational view of the device shown in Figure 1.

Figure 7 is an end elevational view of the carrying case.

Figure 8 is similar to Figure 7 on an enlarged scale and in section.

Figure 9 is an enlarged detail view of the hinge connection between the carrying case and lid.

Figure 10 is a detail view showing the border frame of the display board.

Figure 11 is a sectional view showing a display attached to the board.

Referring now more particularly to the drawings, the device includes a display board 10 and a carrying case 12. The display board 10 comprises a pair of flat rectangular panels 14 and 16 which are arranged in edge-to-edge relation. Running along these panels at or near the adjacent edges thereof are a pair of struts 18 and 20 which extend parallel to each other. These struts are rigidly secured to the backs of the respective panels and hinges 22 connect the struts to each other to permit the panels of the display board to be folded back-to-back. The hinges comprise hinge leaves 24 and 26 respectively secured to the struts and connected to each other by the hinge pins 28.

A border frame surrounds three sides of each panel. The panel 14 has the frame bars 30, 32 and 34 extending around the side and upper edges thereof. The bars are of substantially tubular cross section having slots along the inner edges and flanges 36 extending from the slots inwardly of the panel and gripping the marginal edge of the panel therebetween as illustrated. The panel may be secured within or between the flanges of the frame bars 30—34 in any suitable manner.

The lower panel 16 has frame bars 38, 40 and 42 extending along the side and bottom edges thereof. These frame bars are the same as those previously described, that is, they are substantially tubular and have the flanged slots along the inner edges with the marginal edge of the panel 16 extending between and secured to the flanges of the slots.

The panels 14 and 16 are of the same rectangular dimensions and when folded back-to-back provide a relatively narrow unit of small compact proportions.

The front surface of the panels is covered with a fabric 44 having a pronounced nap or pile. The nap or pile is formed by fibers 46 extending predominantly normal to the front face of the panels and are preferably of some considerable length. Numerous different types of organic or inorganic pile forming materials may be used as a covering for the front face of the board, but particularly satisfactory results have been obtained by employing a cotton flannel. Boards of this type are commonly known as flannel boards.

The board 10 is adapted to support display data. The display 48 is in the form of a cardboard strip which may have any desirable display material attached or printed thereon. The display has pile forming fibers 50 secured to the rear face thereof. Such fibers may be applied in any one of a number of different forms. The fibers form a relatively dense, deep pile and extend substantially normal to the cardboard display 48 so as to effectively inter-engage with the fibers 46 on the flannel board. Particularly satisfactory results are obtained by applying the fibers to the display by a suitable flocking process. The fibers may be formed of either organic or inorganic materials. It is preferred to select a material which will resist softening under various atmospheric conditions, and satisfactory results have been obtained with fibers formed of rayon, nylon, glass or other synthetic materials.

The adjacent ends of the frame bars 30 and 38 and of the bars 34 and 42 oppose one another and extend in continuation of one another when the board is opened out flat for display purposes. The board is retained in a flat extended condition by the locking sleeves 52 and 54. The locking sleeves are in the form of open-ended tubes having a diameter slightly greater than that of the frame bars so as to closely, yet slidably, embrace the frame bars. The frame bars are all, of course, of the same cross sectional dimension. The sleeves are slotted along their inner edges to clear the panels. The frame bars 38 and 42 have stops 56 which engage the lower ends of the sleeves to prevent further downward movement thereof past the stops and thus locate the sleeves in a position bridging the adjacent ends of the opposed side frame bars of the panels. The side frame bars 30 and 34 have stops 58 to prevent the sleeves from sliding upwardly along the latter frame bars beyond the stops. The stops 58 are spaced from the ends of the frame bars 30 and 34 a distance greater than the length of the sleeves so that the sleeves are entirely supported upon the frame bars 30 and 34 when they engage stops 58 to permit the board to be folded to its collapsed position with the panels back-to-back.

The carrying case 12 comprises a fixed front panel 60, side walls 62 extending at right angles to the plane of the front panel 60 at opposite sides thereof and top and bottom walls 64 and 66 extending at right angles to the plane of the front wall at the top and bottom thereof. The carrying case also includes a removable lid 67 having a rear wall 68 which has substantially the same dimensions as the front wall 60. Side walls 70 extend at right angles to the plane of the rear panel 68 at opposite sides thereof and top and bottom walls 72 and 74 extend at right angles to the rear wall at the top and bottom thereof. The bottom wall 74 of the lid 67 is pivotally connected to the bottom wall 66 by hinges 76. Each hinge 76 comprises a hinge leaf 78 secured to the bottom wall 66 having a hinge pin 80 rigidly secured thereto. A hinge leaf 82 is secured to the bottom wall 74 and has a hinge knuckle which comprises an integral extension 84 of the leaf 82 which is arcuate or return-bent to partially embrace the hinge pin 80. The extension 84 extends toward and past the hinge pin and then is return-bent to embrace the remote side thereof when the lid closes the carrying case. However, by merely swinging the lid to open position about aligned axis of the hinge pin 80, the knuckle extension 84 can be separated from the hinge pin to remove the lid.

The latching devices 86 are carried by the top wall 64 and these latching devices cooperate with parts on the top wall 72 of the lid to hold the lid in closed position. These latches 86 may be of any suitable construction and, therefore, are not described in detail. It is sufficient to point out that the latches hold the top edge of the lid against upward swinging relative to the hinge pins 80 and thereby prevent the lid from being removed. The latches are readily releasable to permit the lid to be swung open. The inside dimensions of the carrying case are such that the folded display board can be conveniently stored thererin. The thickness of the folded display board is slightly less than the distance between the front and rear walls of the carrying case. The top, bottom and side walls of the carrying case closely confine the marginal edges of the folded board.

Secured to the inner side of the top wall 64 in laterally spaced relation are a pair of blocks 88. The end surfaces of these blocks which face the removable lid are formed with aligned concave arcuate recesses 90, the axes of the arcuate recesses extending in the direction of length of the top wall. These recesses are provided to support the lower frame bar 40 of the display board when the device is set up for display purposes.

Elastic straps 92 are secured to the front and rear panels of the carrying case extending from the top to the bottom walls thereof. These straps are provided for supporting display material which is intended to be used in connection with the device. The display material is merely inserted between the straps and the associated panel of the carrying case and is held in place by the resilient straps. An anchor board 94 is secured to the rear side of the upper panel 14 and extends transversely thereof. The lower edge provides an abutment surface for a prop which supports the display board.

Figure 1 illustrates the display board set up for display purposes. The sleeves 52 and 54 embrace the side frame bars of the upper and lower panels to hold the display board rigidly in a single plane for display purposes. The bottom frame bar 40 rests in the arcuate recesses 90 of the blocks 88. The display board is propped up in the position illustrated by the removable lid 67. Straps 96 each have one end secured to the anchor board in laterally spaced relationship, the other end thereof having snap fasteners cooperable with buttons on the inner side of the side wall 70 to retain the side wall of the lid against being removed from abutting relationship with the anchor board. The snaps 96 having one part on the side wall of the lid and the other part on the straps may be of any suitable construction and preferably are the kind that are attached by pressure and removed or separated by applying a pull in the opposite direction. In any event, when the snaps 96 are attached to each other with the opposite side or end of the lid supported on the front panel 60 and braced by the bottom wall 66, the display board is rigidly suported and may be used for display purposes. The board may be taken down by undoing the snaps 96 and then folding the board so that the panels 14 and 16 are back-to-back. The folded display board is then inserted into the carrying case so that the side frame bars 30, 34 or 38, 42 rest against the blocks 100 secured to the inner sides of the side walls 62 of the case. Actually, these side frame bars rest against the surface of blocks 100 which face the lid 67. The end frame bar 32 or 40 rests in the recesses 90 of blocks 88. The rear panel 68 of lid 67 holds the display board against the blocks 88 and 100 to firmly support the board within the case even when carried about. While in Figure 8 the rear wall of the lid is spaced from the board, this clearance is sufficiently small to prevent the end frame bars from getting out of the recesses. Likewise, the clearance between the lid rear panel and the board in the region of blocks 100 is negligible so that the board is firmly supported at this point also. Clearance is provided only to insure that the lid will close without interference from the board. For all practical purposes, it may be said that the rear wall of the lid holds the board firmly against the blocks 88 and 100.

A carrying handle 102 is hingedly secured to the top wall 64 and a similar handle 104 is hingedly secured to the rear wall of the lid. This latter handle makes it possible to carry the case under the arm.

It will be seen that I have provided a convenient and highly useful display device which may be readily stored and which requires no additional parts other than the case in which it is carried for propping it up for display purposes.

What I claim as my invention is:

A display device comprising a board, an open-top carrying case for said board receiving and containing said board for storage and transport, blocks secured within said case having aligned arcuate recesses for removably supporting one edge of said board when said board is propped upright for display purposes, said case having hinged thereto a lid for the open top of said case, said lid being removable to serve as a prop for supporting said board in upright position in cooperation with said blocks, said board having an abutment on the back, a second abutment formed by the inside surface of said case and spaced from said blocks, said lid, when serving as a prop, having one edge engageable with said first-mentioned abutment and the opposite edge engageable with said second abutment, releasable means for fastening said first-mentioned abutment to said lid, said one edge of said board being supported in the recess of said blocks when said board is stored in said case, said one edge of said board being an enlarged bead of arcuate contour complementary with said recesses to enable said board to be swung about the axis of said aligned recesses and while said bead engages said recesses from stored position in said case to upright position, said lid, in the closed position thereof, having a portion opposite said blocks engageable with said board for holding said bead in said recesses, and additional blocks secured within said case and spaced from the recessed blocks for supporting within said case a portion of said board spaced from said one edge, said lid having a second portion opposite said additional blocks for holding said portion of said board upon said additional blocks.

References Cited in the file of this patent

UNITED STATES PATENTS

| 116,506 | Smith | June 27, 1871 |
| 696,044 | Hoffmann | Mar. 25, 1902 |
| 701,658 | Wixcel | June 3, 1902 |
| 1,104,253 | Dunphee | July 21, 1914 |
| 1,444,522 | Pedlar | Feb. 6, 1923 |
| 1,465,850 | Kinsman | Aug. 21, 1923 |
| 1,851,600 | Stanley | Mar. 29, 1932 |
| 1,863,047 | Grimsley | June 14, 1932 |
| 2,576,384 | Bentley | Nov. 27, 1951 |

FOREIGN PATENTS

| 326,059 | Germany | Sept. 22, 1920 |